United States Patent [19]
Abe

[11] Patent Number: 5,204,736
[45] Date of Patent: Apr. 20, 1993

[54] IMAGE PROCESSING APPARATUS
[75] Inventor: Shunichi Abe, Yokohama, Japan
[73] Assignee: Canon Kabushiki Kaisha, Tokyo, Japan
[21] Appl. No.: 333,040
[22] Filed: Apr. 4, 1989
[30] Foreign Application Priority Data
  Apr. 5, 1988 [JP]  Japan ................... 63-82247
[51] Int. Cl.$^5$ ............................................. H04N 1/46
[52] U.S. Cl. ........................................ 358/75; 358/76; 358/80
[58] Field of Search ............... 358/75, 76, 80, 448, 358/452, 453, 461, 463, 464; 382/9

[56] References Cited

U.S. PATENT DOCUMENTS

| | | | |
|---|---|---|---|
| 4,275,958 | 6/1981 | Tachika ........................... | 335/14 R |
| 4,463,373 | 7/1984 | Mikami ............................ | 358/75 |
| 4,745,465 | 5/1988 | Kwon .............................. | 358/75 |
| 4,772,911 | 9/1988 | Sasaki et al. .................... | 358/75 |
| 4,792,847 | 12/1988 | Shimazaki et al. .............. | 358/80 |
| 4,833,491 | 5/1989 | Rezanka .......................... | 358/75 |
| 4,894,685 | 1/1990 | Shoji .............................. | 355/326 |
| 4,941,057 | 7/1990 | Lehmbeck et al. ............. | 358/75 |
| 4,954,883 | 9/1990 | Belmares-Sarabis et al. ... | 358/22 |
| 4,962,421 | 10/1990 | Murai ............................ | 358/76 |
| 4,992,864 | 2/1991 | Akiyama ....................... | 358/75 |

FOREIGN PATENT DOCUMENTS

0292212 11/1988 European Pat. Off. .

Primary Examiner—Stephen Brinich
Assistant Examiner—Jerome Grant, II
Attorney, Agent, or Firm—Fitzpatrick, Cella, Harper & Scinto

[57] ABSTRACT

A color image processing apparatus comprises: a device to supply color image data obtained by photoelectrically converting an object image; a changing circuit which has a density conversion table and changes the density of the color image data supplied by the supplying device into a plurality of densities on the basis of the table; and a reproducing device such as a bubble jet printer for reproducing the image data whose density was changed by the changing circuit as a plurality of visible images which can be simultaneously seen. With the apparatus, an image of a desired color or density can be preferably reproduced.

43 Claims, 11 Drawing Sheets

FIG. 1B
READER SECTION

FIG. 1C
PRINTER SECTION

IMAGE PROCESSING APPARATUS

BACKGROUND OF THE INVENTION

1. Field of the Invention

The present invention relates to an image processing apparatus.

2. Related Background Art

Hitherto, as a color image forming apparatus, for instance, as a color copying apparatus, there has been known an apparatus in which when a part of an original image is scanned, it is read while switching color filters, and the image is reproduced on the basis of the read image information.

According to such a color copying apparatus, the color ratio of the reproduced image changes from the edge portion of the original image step by step.

Since the conventional color image forming apparatus, for instance, a color copying apparatus is constructed as mentioned above, there are the following problems:

(1) It is difficult to accurately reproduce a color which exists at a remote position on an original or to reproduce a desired color according to the original.

(2) The sensing of a color in the cases where the color solely exists in one area and where another color exists in another area near that color are quite different. However, such a difference cannot be compared.

On the other hand, the foregoing color copying apparatus reproduces a color image by changing the color incrementally every area of an original. Therefore, in the case where the color or density pattern of the image is not uniform in every area of the original, there is a problem such that even if the color is changed incrementally, it is difficult to determine whether the color is the most preferable or not.

Such a problem also similarly occurs even when considering only the density without limiting to the color.

SUMMARY OF THE INVENTION

It is an object of the present invention to provide an image processing apparatus which can solve each of or all of the foregoing problems.

Another object of the invention is to provide an image processing apparatus which can properly evaluate an adjusting state of a color or density.

Still another object of the invention is to provide an image processing apparatus which in particularly can preferably reproduce a color or density of a desired area of an image.

Still another object of the invention is to provide a color image forming apparatus which can accomplish the above objects.

Under such objects, according to a preferred embodiment of the invention, there is disclosed a color image forming apparatus comprising: range designating means for designating an image reading range on a color original; image reading means for reading an image from the range designated by the range designating means; density changing means for changing a predetermined color of the read image to a plurality of predetermined densities; and recording means for recording the image of the changed density to a predetermined position each time the density of a predetermined color is changed.

The above and other objects and features of the present invention will become apparent from the following detailed description and the appended claims with reference to the accompanying drawings.

BRIEF DESCRIPTION OF THE DRAWINGS

FIGS. 1 to 6 are diagrams showing an embodiment of the present invention;

FIGS. 1, 1A, 1B and 1C are block diagrams showing an image signal processing circuit;

DETAILED DESCRIPTION OF THE PREFERRED EMBODIMENT

The present invention will be described in detail hereinbelow with reference to the drawings.

FIGS. 1 to 6 show an embodiment of the invention. The embodiment shows an example in the case where the invention is applied to a digital color copying apparatus.

Figures 1, 1A:
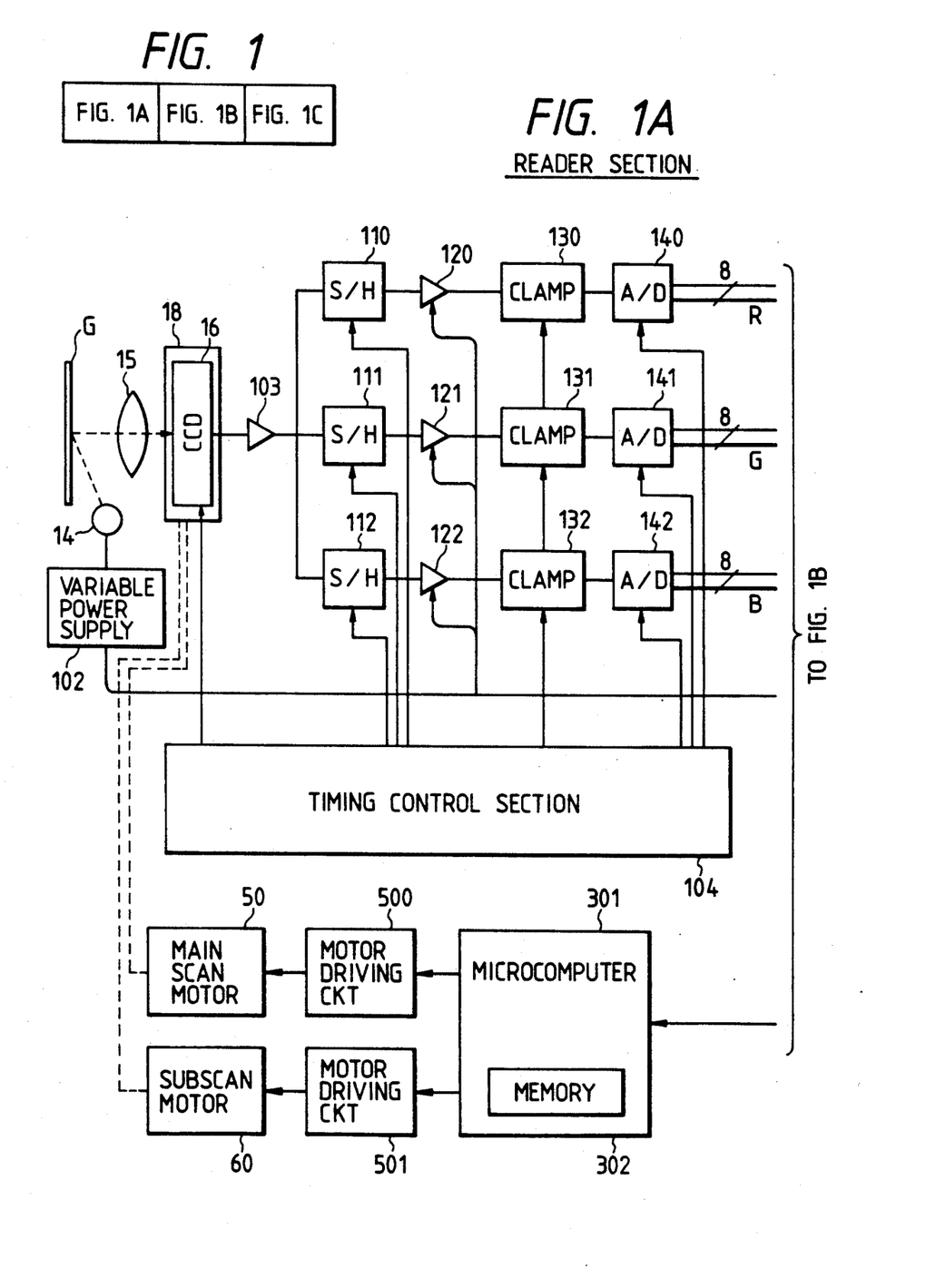
Figure 1B:
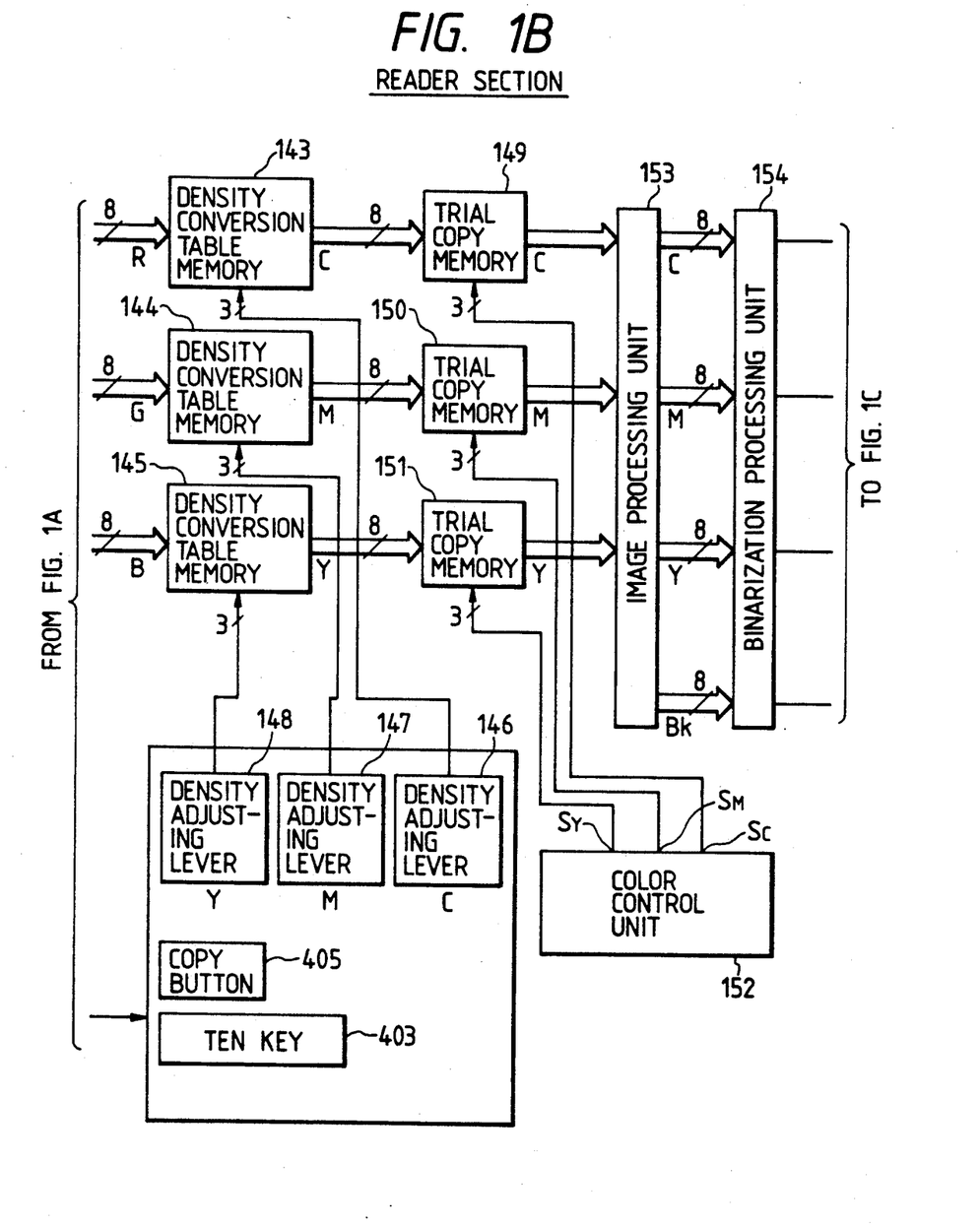
Figure 1C:
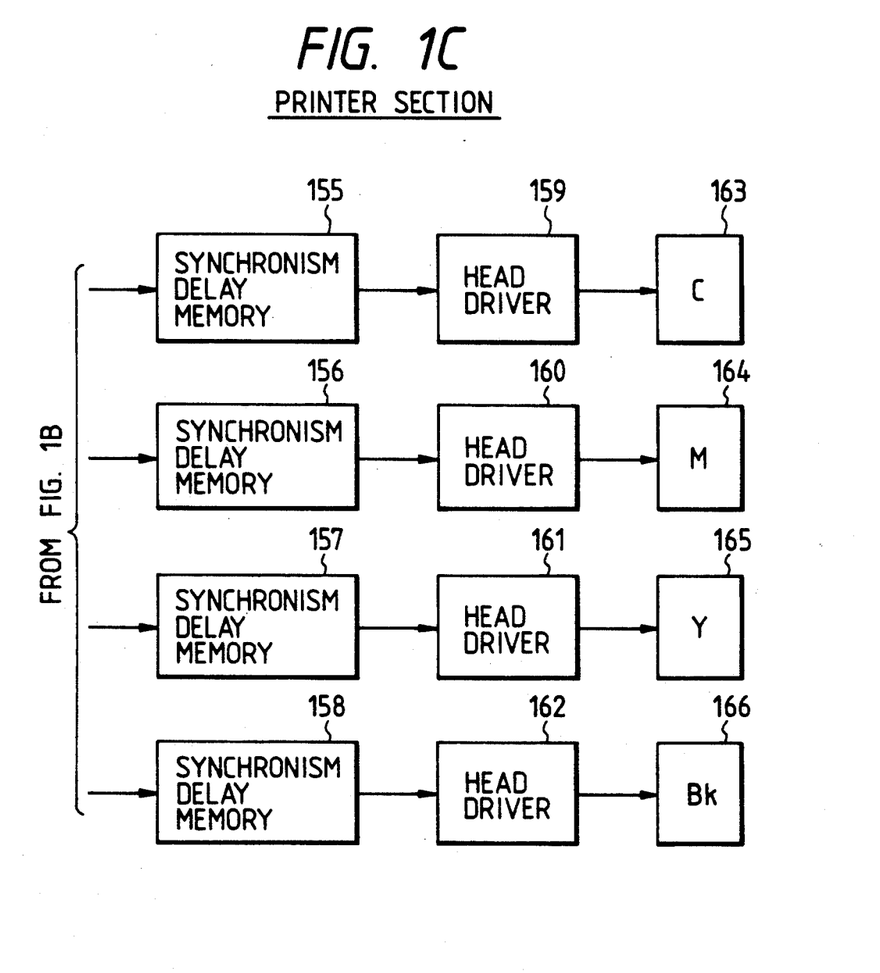
Figure 2:
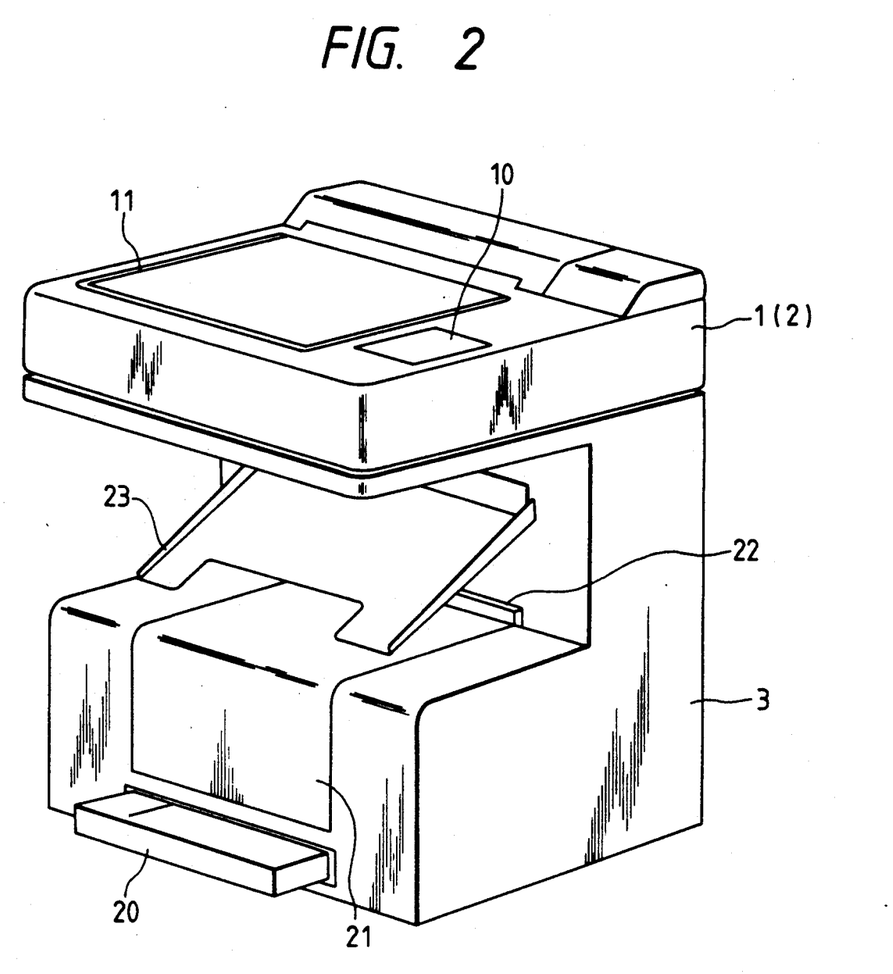
FIG. 2 is a perspective view of a digital color copying apparatus.

The copying apparatus can be separated into upper and lower portions as shown in FIG. 2 illustrating its perspective external view. The upper portion has a color image scanner unit 1, a control unit 2, an operation unit 10, and an original pressing plate 11. The lower portion has a printer unit 3.

The upper and lower portions can be also installed at a remote position by connecting a cable.

Color image scanner unit 1

The color image scanner unit (image reading means) 1 has therein a mechanism to read a solid object or sheet original which is put upside down under the original placing plate 11 and a mechanism to read a sheet original of a large size. The color image scanner unit 1 reads an original image and outputs digital color image data of the read original image.

Figure 3:
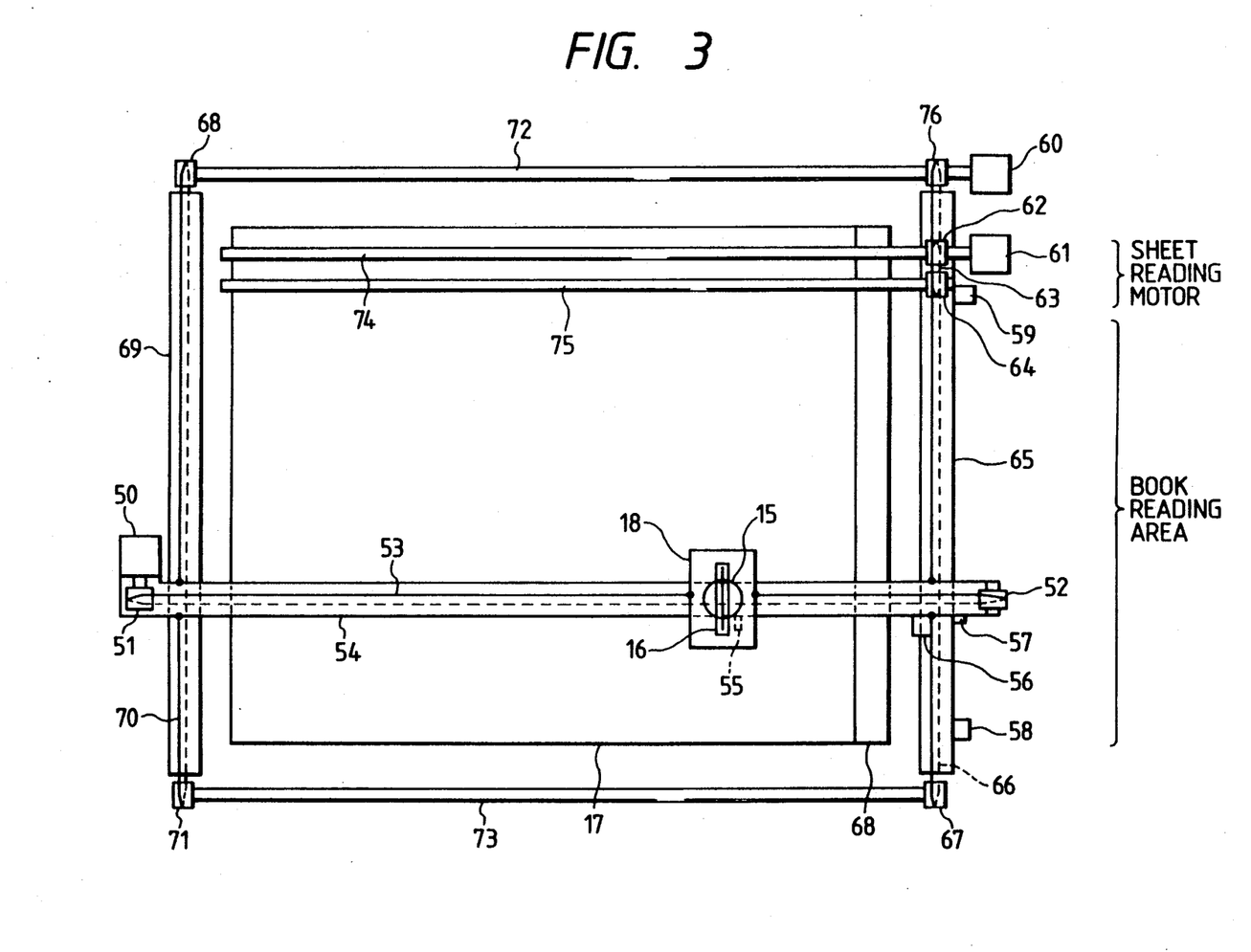
FIG. 3 is a plan view showing the main section of a color image scanner unit 1.
Figure 4:
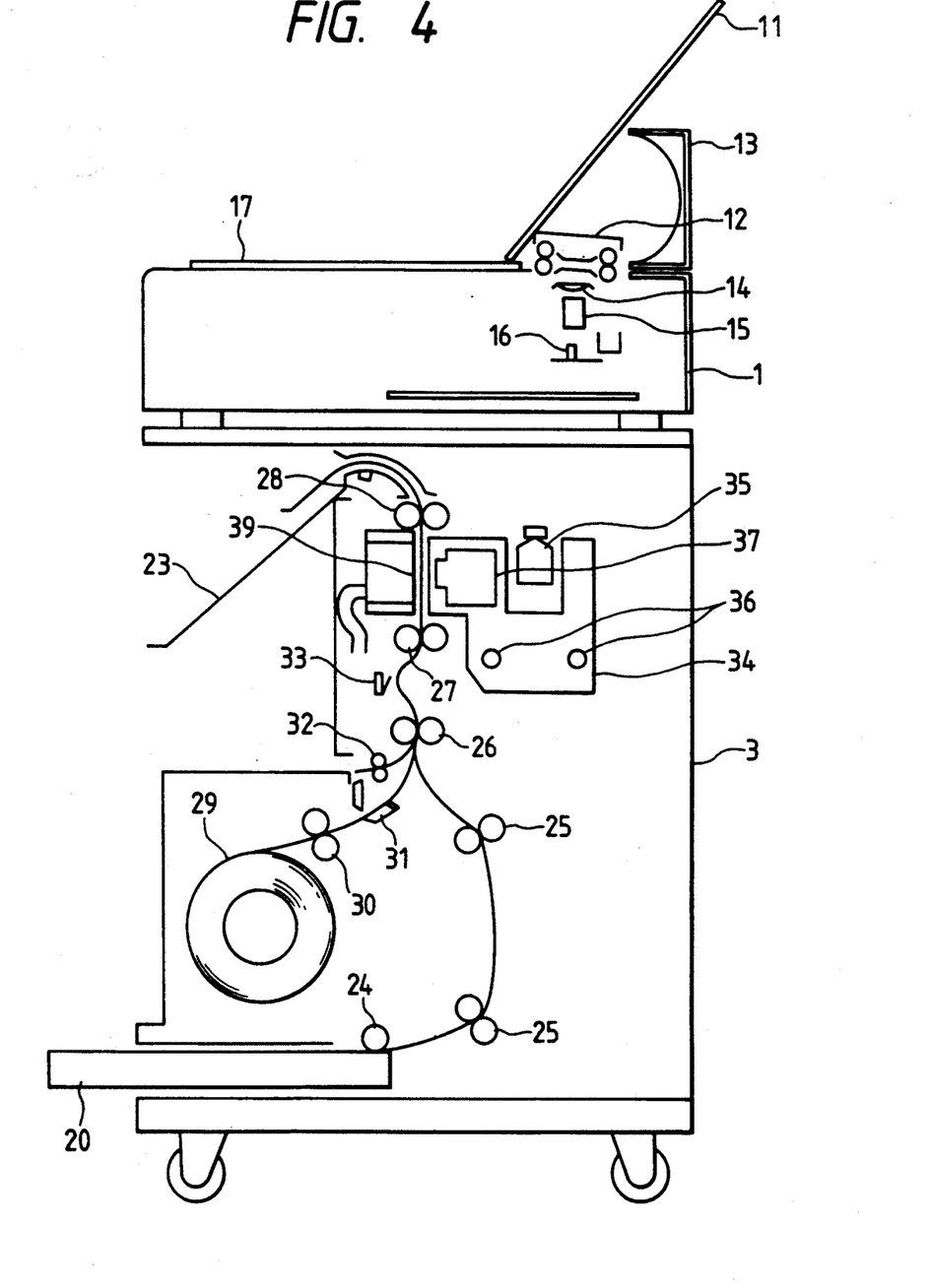
FIG. 4 is a cross-sectional view showing the main sections of the color image scanner unit 1 and a printer unit 3.

FIGS. 3 and 4 show the main section of the color image scanner unit 1 shown in FIG. 2.

In FIG. 3, a CCD unit 18 comprises a CCD 16, a lens 15, and the like. The CCD unit 18 is moved on a rail 54 by a driving system in the main scanning direction comprising a main scan motor 50, a pulleys and 52, and a wire 53 and fixed on the rail 54 and reads an image of an original placed on an original placing glass 17 in the main scanning direction. A light interrupting plate 55 and a home position sensor 56 are used to control the position in the case where the CCD unit 18 is moved to the home position of the main scanning direction which is located in a correction area 68 shown in FIG. 7.

The rail 54 is placed on rails 65 and 69 and is moved by a driving system in the subscanning direction, comprising a subscan motor 60, pulleys 67, 68, 71, and 76, axes 72 and 73, and wires 66 and 70. The light interrupting plate 57 and home position sensors 58 and 59 are used to control the position in the case of moving the rail 54 to the home position of the subscan in each of the book mode to read an original such as a book or the like placed on the original placing glass 17 and the sheet mode to read out a sheet, respectively.

A sheet feeding motor 61, sheet feeding rollers 74 and 75, pulleys 62 and 64, and a wire 63 comprise a mechanism to feed a sheet original placed upside down on the original placing glass 17 by a predetermined amount at a time.

Figure 7:
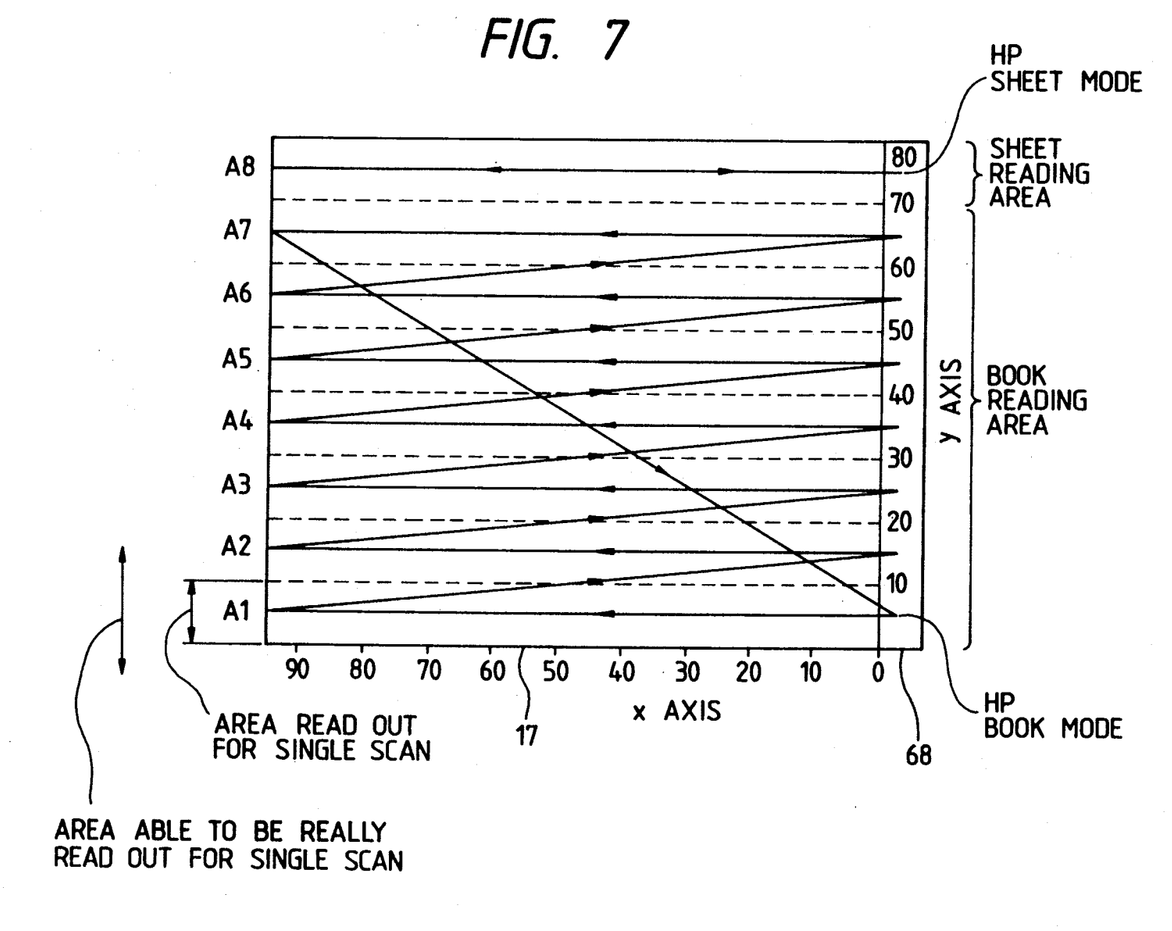
FIG. 7 is an explanatory diagram of the reading operation.

FIG. 7 is an explanatory diagram for the reading operation.

Prior to starting the reading operation of the whole surface of an original put on the original placing glass 17, the CCD unit 18 is moved to the book mode home position (book mode HP) as a reading start position in the correction area 68.

On the other hand, prior to scanning an original, the processes such as shading correction, color correction, and the like are executed in the correction area 68. Thereafter, the scan is started by the main scan motor 50 in the main scanning direction, that is, in the direction indicated by an arrow shown in the diagram. After completion of the reading operation of an area $A_1$, the main scan motor 50 is reversely rotated and the subscan motor 60 is driven, thereby moving to the correction area 68 in an area $A_2$ in the subscanning direction. Subsequently, in a manner similar to the case of the main scan of the area $A_1$, the processes such as shading correction, color correction, and the like are executed as necessary and the reading operation of the area $A_2$ is executed.

By repeating the above scanning operation, the whole areas $A_1$ to $A_7$ are read. After completion of the reading operation of the area $A_7$, the CCD unit 18 is returned to the book mode home position.

The reason why the number of scanning times is small is to enable the operation to be easily understood. Actually, the scan must be executed a larger number of scanning times since an original of up to $A_2$ size placed on the original placing glass 17 can be read.

Control unit 2

The control unit 2 outputs instructions regarding the operations to the color image scanner unit 1 and printer unit 3 in accordance with various kinds of information as a copying apparatus which are input from the operation unit 10.

Advanced processes, for instance, complicated editing processes can be executed by attaching a digitizer or the like in place of the original pressing plate 11 with connection to the control unit 2.

Printer unit 3

Figure 5:
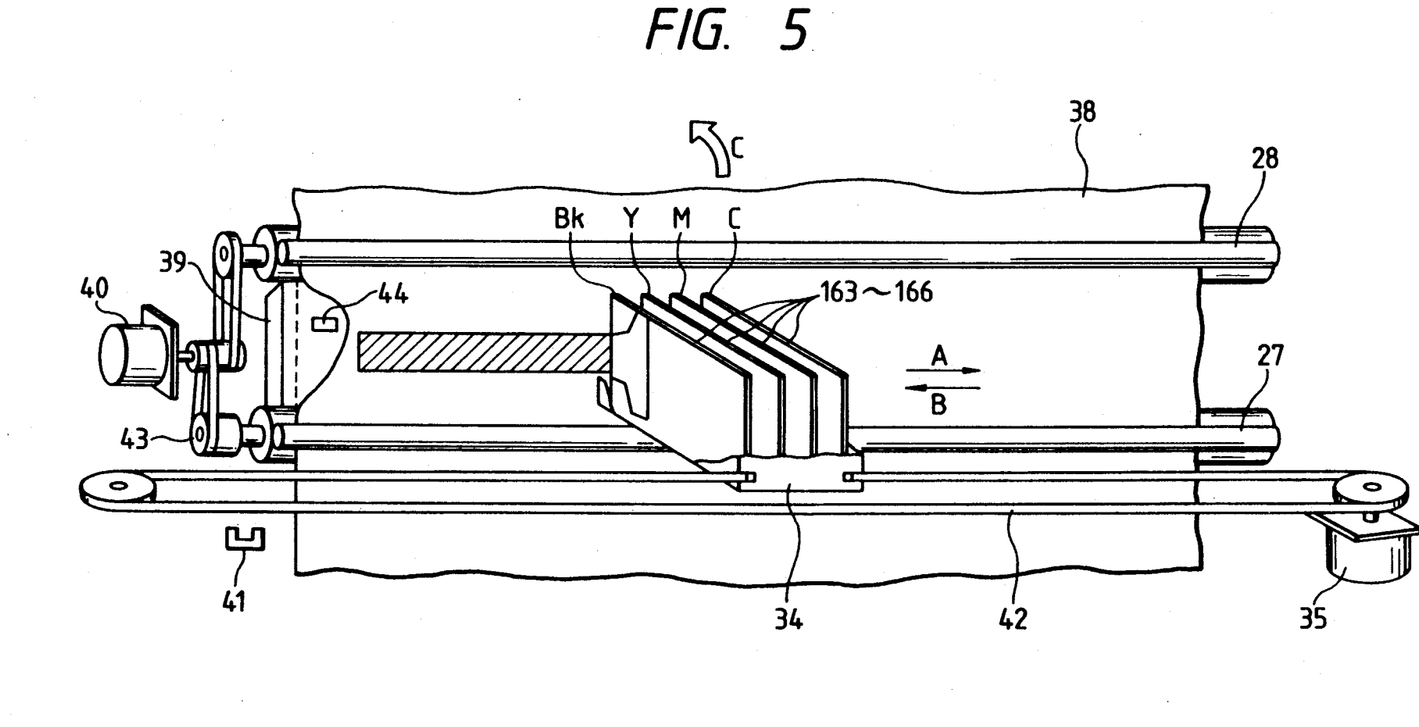
FIG. 5 is a perspective view showing the main section of the printer unit 3.

The printer unit (recording means) 3 is a full color ink jet printer using a recording head unit 37 having recording heads 163 to 166 of the bubble jet system shown in FIG. 5. The unit records onto a recording paper a color digital image signal which is output from the control unit 2.

The bubble jet system is a system in which a liquid droplet is emitted by boiling a film with thermal energy. The recording heads 163 to 166, shown in FIG. 5, are ink jet nozzles of the bubble jet system. Each of the recording heads is constructed by assembling 256 ink jet nozzles. In this embodiment four assemblies are used as the recording heads.

In FIG. 4, a pick up roller 24 is provided to feed cut papers one by one from a paper feeding cassette 20. The cut paper fed is conveyed until a first roller 26 is fed with a cut paper feeding roller 25.

A roll paper 29 is fed out by a roll paper feeding roller 30 and is cut to a length of a fixed size by a cutter 31. The cut paper is conveyed until the first roller 26.

A recording paper which is inserted from a manual insertion port 22 is conveyed until the first roller 26 by a hand inserting roller 32 in a manner similar to the case of the roll paper 29.

The pick up roller 24, cut paper feeding roller 25, roll paper feeding roller 30, first paper feeding roller 26, and hand inserting roller 32 are driven by a paper feeding motor (DC servo motor) (not shown) and can be turned on and off at any time by electromagnetic clutches provided for the rollers.

When the printing operation is started by an instruction from the control unit 2, the recording paper selected and fed by either one of the foregoing paper feeding paths is conveyed until the first roller 26. A paper loop of a predetermined amount of the recording paper is formed to eliminate the oblique movement of the paper and, thereafter, the first paper feeding roller 26 is driven to convey the recording paper to a second paper feeding roller 27.

In order to execute the accurate paper feeding operation between a paper feeding roller 28 and the second paper feeding roller 27, the recording paper is slackened by a predetermined amount to form a buffer between the first roller 26 and the second roller 27. A buffer amount detection sensor 33 is provided to detect a buffer amount. By always forming such a buffer during the conveyance of the paper, in particular, in the case of conveying a recording paper of a large size, the loads which are, applied to the rollers 28 and 27 can be reduced, so that the accurate paper feeding operation can be performed.

When printing with recording heads 163 to 166, a scanning carriage 34 comprising the recording heads 163 to 166 and the like executes the reciprocating scan on a carriage rail 36 by a scanning motor 35. In the scan in the forward direct, an image is printed onto the recording paper. In the scan in the return direction, the recording paper is fed by only a predetermined amount, by the paper feeding roller 28. At this time, the driving system is controlled by the paper feeding motor so as to always obtain a predetermined buffer amount, while detecting the buffer amount by the buffer amount detection sensor 33.

The printed recording paper is discharged onto a paper discharging tray 23 and the printing operation is completed.

Scanning carriage 34 and its peripheral parts

In FIG. 5, a paper feeding motor 40 is a driving source to intermittently feed the recording paper and to drives the paper feeding roller 28. The motor 40 also drives the second paper feeding roller 27 through a second paper feeding roller clutch 43.

The scanning motor 35 is a driving source to scan the scanning carriage 34 through a scanning belt 42 in the directions of arrows A and B. In the embodiment, since it is necessary to accurately execute the paper feeding control, pulse motors are used as the paper feeding motor 40 and scanning motor 35.

When the recording paper reaches the second paper feeding roller 27, the second paper feeding roller clutch 43 and paper feeding motor 40 are turned on and the recording paper is conveyed on a platen 39 until the paper feeding roller 28.

The recording paper is detected by a paper detection sensor 44 provided on the platen. Sense information of the sensor 44 is used for position control, jam control, and the like.

When the recording paper reaches the paper feeding roller 28, the second roller clutch 43 and motor 40 are stopped and the attracting operation is executed from the inside of the platen 39 by an attracting motor (not shown), thereby closely attracting the recording paper onto the platen 39.

The ordinary reading operation will now be described.

Prior to executing the image recording operation onto the recording paper, the scanning carriage 34 is first moved to the position of a home position sensor 41. Next, the carriage 34 is moved in the direction of the arrow A and the scan on the going path is executed. Inks of cyan, magenta, yellow, and black are emitted by the recording heads 163 to 166 from a predetermined position, thereby recording an image. After completion of the recording of the image of a predetermined length, the scanning carriage 34 is stopped once. Thereafter, the carriage is moved opposite to the direction of the arrow B and the scan on the reverse direction is executed. The carriage is returned to the position of the home position sensor 41. During the scan on the reverse direction, the recording paper is fed by the length of the image recorded by the recording heads 163 to 166 in the direction of an arrow C by driving the paper feeding roller 28 with paper feeding motor 40.

When the scanning carriage 34 is detected by the home position sensor 41 and is stopped at the home position, the recovering operations of the recording heads 163 to 166 are executed. This is because a variation in emission start time which is due to a change in viscosity or the like of the inks remaining in the nozzles of the recording head 37 is prevented, thereby executing the stable recording operation. As the recovering operation, the pressurizing operation to the recording head 37, blank emitting operations of the inks, and the like are executed on the basis of the conditions such as paper feeding time, temperature variation in the apparatus, emitting time, and the like which have previously been programmed.

After that, by repeating the above-mentioned operations, an image is recorded onto the whole surface of the recording paper.

Operation Unit 10

Figure 6:
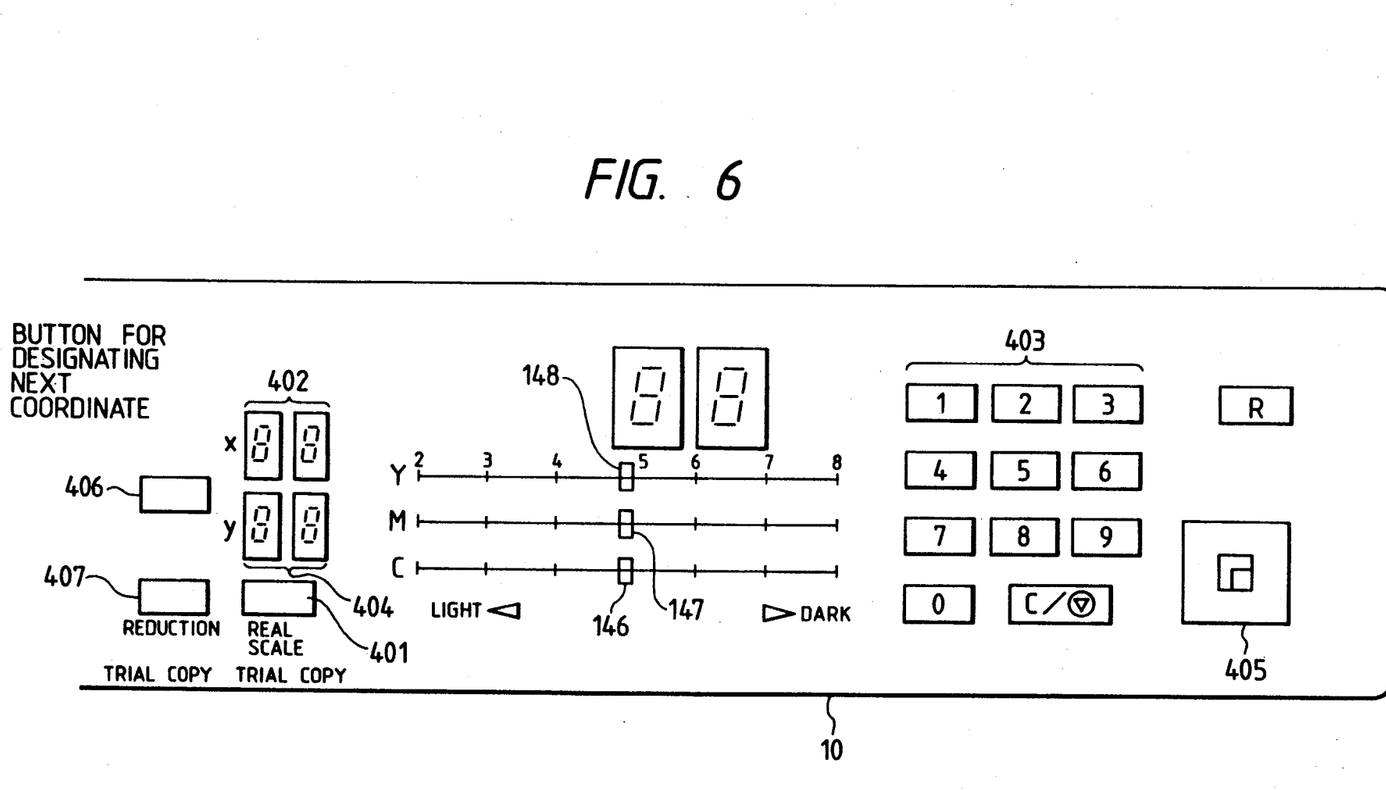
FIG. 6 is a plan view showing the main section of an operation unit 10.

In FIG. 6, reference numeral 401 denotes a real scale trial copy mode button; 402 indicates a 7-segment LED to display an x axis; 403 a ten-key (range designating means); 404 a y axis display LED; 405 a copy button; 406 a button to designate the next coordinate; and 407 a reduction trial copy button.

Reference numeral 146 denotes a cyan density adjusting lever; 147 is a magenta density adjusting lever; and 148 a yellow density adjusting lever.

When the cyan, magenta, and yellow density adjusting levers 146, 147, and 148 are set to scale 2, the densities are set to 0, that is, the densities are reduced by only about 33%. In the case where the levers are set to scale 3, the densities are set to 1, that is, the densities are reduced by only about 22%. In another case where the levers are set to scale 4, the densities are set to 2, that is, the densities are reduced by only about 10%. When the levers are set to scale 5, the densities are set to 3, that is, the densities are set to the standard values and are not changed. When the levers are set to scale 6, the densities are set to 4, that is, the densities are increased by only about 10%. When the levers are set to scale 7, the densities are set to 5, that is, the densities are increased by only about 22%. When the levers are set to scale 8, the densities are set to 6, that is, the densities are increased by only about 33%.

Image signal processing circuit

In FIGS. 1, 1A–1C, reference numerals 14 to 16 and 146 to 148 denote the same or corresponding parts or components as those shown in FIG. 3. Element G indicates an original. Reference numeral 102 denotes a variable power supply to control a light amount of an exposing lamp 14. The variable power supply 102 is controlled by a color control unit 152. Reference numeral 103 denotes an amplifier to amplify a signal from the CCD 16.

Reference numerals 110, 111, and 112 denote sample and hold circuits to sample and hold the signal amplified by the amplifier 103.

Reference numerals 120, 121, and 122 denote amplifiers to amplify signals from the sample and hold circuits 110, 111, and 112, respectively.

Reference numerals 130, 131, and 132 denote clamp circuits to clamp signals from the amplifiers 120, 121, and 122, respectively.

Reference numerals 140, 141, and 142 denote A/D converters to convert analog signals from the clamp circuits 120, 121, and 122 into digital signals, respectively.

Reference numeral 104 denotes a timing control unit to control the timings for the CCD 16, sample and hold circuits 110, 111, and 112, amplifiers 120, 121, and 122, clamp circuits 130, 131, and 132, and A/D converters 140, 141, and 142, respectively.

Reference numerals 143, 144, and 145 denote density conversion table memories to store the digital signals from the A/D converters 140, 141, and 142, respectively. The cyan, magenta, and yellow density adjusting levers 146 to 148 are connected to the memories 143 to 145. Density changing means is constructed by the density adjusting levers 146 to 148 and density conversion table memories 143 to 145.

Reference numerals 149, 150, and 151 denote trial copy memories to store signals from the memories 143 to 145 by only the amounts corresponding to predetermined regions, respectively. The trial copy memories 149 to 151 are memories having substantially the same contents as the density conversion table memories except a different point such that the contents of the memories are switched by the color control unit 152.

Reference numeral 153 denotes an image processing unit to process C, M, and Y information from the trial copy memories 149 to 151.

Reference numeral 154 denotes a binarization processing unit to binarize C, M, Y, and BK information from the image processing unit 153.

Reference numerals 155 to 158 denote synchronism delay memories to temporarily store the binarized C, M, Y, and BK information from the binarization processing unit 154.

Reference numerals 159 to 162 denote head drivers to drive the recording heads 163 to 166 on the basis of the C, M, Y, and BK information from the synchronism delay memories 155 to 158.

Reference numeral 301 denotes a microcomputer for allowing the coordinates which are input by the ten-key 403 to be stored into a memory 302, for allowing the main scan motor 50 to be driven by a motor driving circuit 500, and for allowing the subscan motor 60 to be driven by a motor driving circuit 501 on. the basis of the stored coordinates.

The operation of the embodiment will now be described with respect to an example in the case of performing the real scale trial copy of both of a human face and a flower shown in FIG. 8.

First, the original G is placed onto the original placing glass 17 by setting the image side to the down side. The original image, for, a man, a house, a mountain, and a flower can be seen as a light image on the back side through the original paper.

The central coordinates of the portion of the human face are set to (15, 25) and the central coordinates of the flower portion are set to (5, 5). When the real scale trial copy mode button 401 is then pressed to select the real scale trial copy mode, the 7-segment LED 402 to display the x coordinate starts flickering.

In the case of inputting the central coordinates (15, 25) of the human face portion, the x coordinate, that is, "15" is input by using the ten-key 403. Thus, "15" is displayed on the x axis display LED 402 and, at the same time, the y axis display LED 404 starts flickering. By inputting the y coordinate, that is, "25" by the ten-key 403, "25" is displayed on the y axis display LED 404.

Next, by pressing the next coordinate designating button 406, the LEDs 402 and 404 start flickering and the central coordinates (15, 25) of the human face portion are simultaneously stored into the memory 302 of the microcomputer 301.

Since the central coordinates (5, 5) of the flower portion can be also key-input in a manner similar to the case of the human face portion, its description is omitted.

After the central coordinates (5, 5) of the flower portion were set, by pressing the copy button 405, the CCD unit 18 starts moving from the book mode home position by the main scan motor 50 and subscan motor 60. The CCD unit 18 is moved to the position of the x coordinate "15" in the x axis direction and to the position of the y coordinate "25" in the y axis direction.

Figure 8:
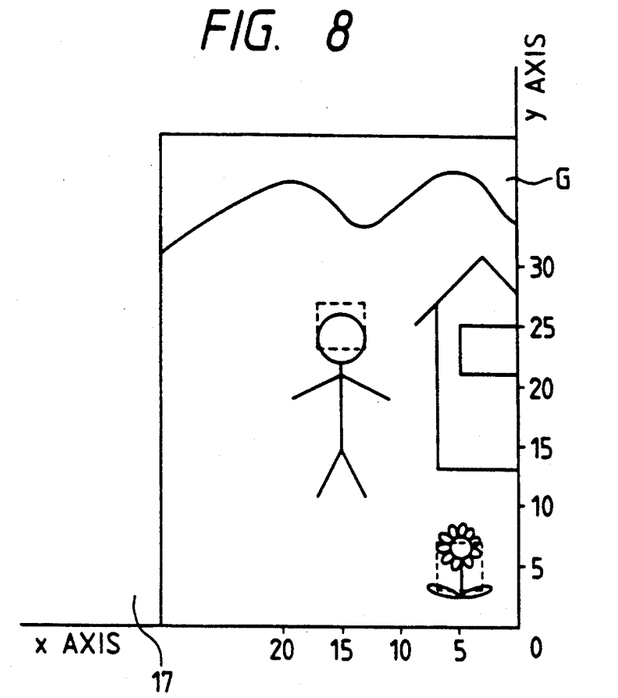
FIG. 8 is a diagram showing an example of an image in the case of the real scale trial copy.

After completion of the positioning operation, the reading operation of an image in a predetermined range, that is, in the portion surrounded by a broken line in FIG. 8 is started.

The reading operation will now be described.

When the exposing lamp 14 is lit by the variable power supply 102, the image of the original G illuminated by the exposing lamp 14 becomes a reflection optical image and is formed onto the CCD 16 through the lens 15. The optical image is then photoelectrically converted into serial image signals of red (R), green (G), and blue (B) by the CCD unit 18. The image signals are amplified by the amplifier 103.

The image signals are then separated into the R, G, and B signals by the sample and hold circuits 110 to 112. The separated R, G, and B signals are amplified by the amplifiers 120 to 122, respectively. Then, they are reproduced as DC signals by the clamp circuits 130 to 132 and converted into the digital signals by the A/D converters 140 to 142. The digital R, G, and B information are stored into the density conversion table memories 143 to 145, respectively.

The R, G, and B information stored into the memories 143 to 145 are stored into the trial copy memories 149 to 151 by the color control unit 152, respectively.

The image formation of the portion of the head of a man will now be described.

(1) In the case where SC=3, SM=3, and SY =1 are respectively input from the color control unit 152 into the trial copy memories 149, 150, and 151:

The C, M, and Y information read out of the trial copy memories 149 to 151 are image processed by the image processing unit 153 and then binarized by the binarization processing unit 154. The binarized C, M, Y, and BK information are once stored into the synchronism delay memories 155 to 158.

On the basis of the C, M, Y, and BK information stored in the synchronism delay memories 155 to 158, the recording heads 163 to 166 are driven by the head drivers 159 to 162 and the image of the human head portion is formed in the upper area of the first row and the first column of the recording paper.

In the image formed, only the density of yellow (Y) is reduced by only 22%.

(2) In the case where SC=3, SM=3, and SY=2 are respectively input from the color control unit 152 into the trial copy memories 149, 150, and 151:

The image of the human head portion is formed in the upper area of the first row and the second column of the recording paper by the operations which are essentially similar to those in the case of (1).

In the image formed, only the density of yellow (Y) is reduced by only 10%.

Only the results are shown hereinbelow.

(3) In the case where SC=3, SM=3, and SY=3:

The image of the human head portion is formed in the upper area of the first row and the third column of the recording paper. In the image formed, the densities are set to the standard densities.

(4) In the case where SC=3, SM=3, and SY=3:

The image of the human head portion is formed in the upper area of the first row and the fourth column of the recording paper. In the image formed, only the density of Y is reduced by only 10%.

(5) In the case where SC=3, SM=3, and SY=5:

The image of the human head portion is formed in the upper area of the first row and the fifth column of the recording paper. In the image formed, only the density of Y is reduced by only 22%.

Next, only the density of magenta (M) is changed in a manner similar to the above and the image of the human head portion is formed in the upper area of the second row. Thereafter, only the density of cyan (C) is changed in a manner similar to the above and the image of the human head portion is formed in the upper area of the third row.

Further, the image of the human head portion is formed in the upper area of the fourth row by changing the densities as follows.

(a) SC=1, SM=1, SY=1
(b) SC=2, SM=2, SY=2
(c) SC=3, SM=3, SY=3
(d) SC=4, SM=4, SY=4
(e) SC=5, SM=5, SY=5

Next, the image of the flower portion is formed. The image formation of the flower portion essentially differs from the image formation of the human head portion with respect to a point that the image of the flower portion is formed in the lower area of each row of the image of the human head portion.

Figure 9:
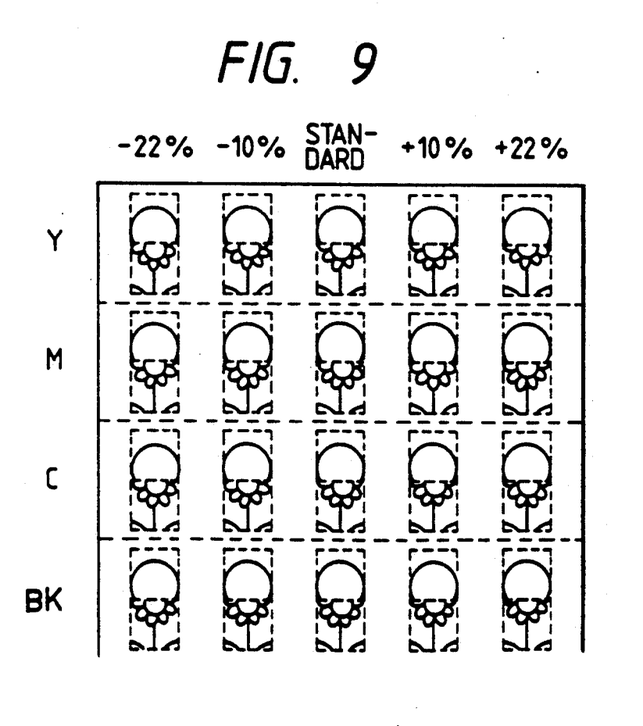
FIG. 9 is a diagram showing an example of the real scale trial copy.

FIG. 9 shows an example of the images formed in this manner.

As the result of the examination of FIG. 9, if the most preferable color exists in the image of the second row and the fourth column, that is, the image in which the density of magenta is increased by only 10%, in the actual copying operation, the magenta density adjusting lever 147 is set to scale 6 and, thereafter, the copy is executed. Thus, the copy of the proper color is derived.

Figure 10:
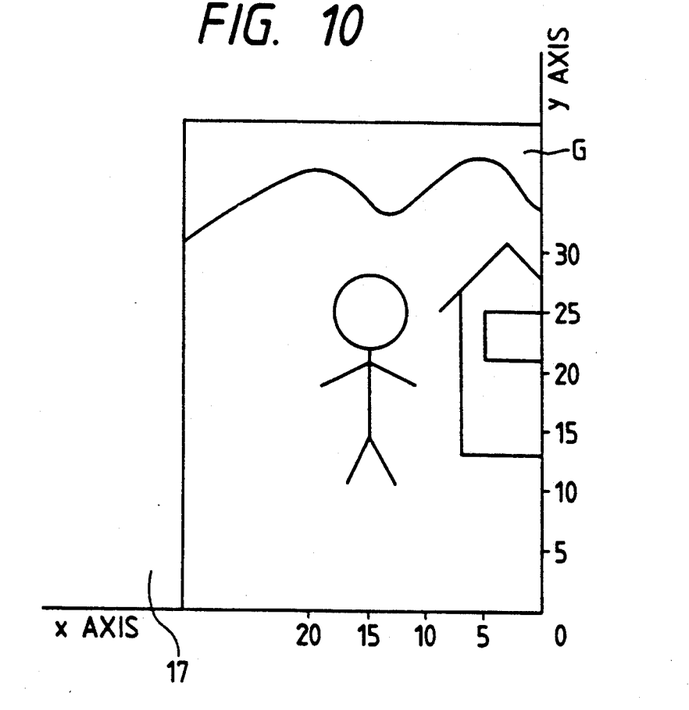
FIG. 10 is a diagram showing an example of an image in the case of the reduction trial copy.
Figure 11:
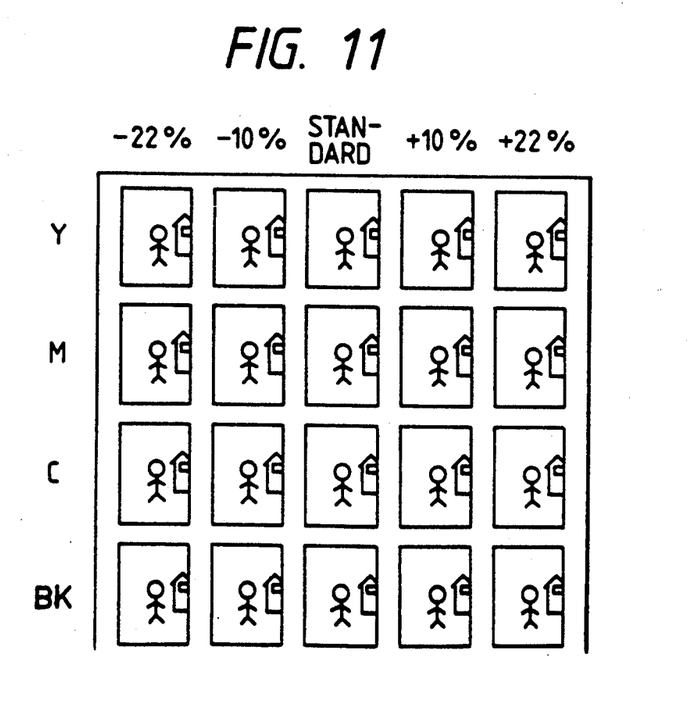
FIG. 11 is a diagram showing an example of the reduction trial copy.

Although the embodiment has been described with respect to the real scale trial copy, the operation in the case of the reduction trial copy is also essentially similar to that in the real scale trial copy. FIG. 11 shows an example of the reduction trial copy of the image shown in FIG. 10.

As a reducing method, there has been known a method whereby to reduce in the main scanning direction, the moving speed of the scanner is raised when an image is read, and to reduce in the subscanning direction, the printer is operated in an ordinary manner while thinning out the data of the pixels which were read.

Although the embodiment has been described with respect to the example in which a reading range is designated by designating the central coordinates of an image, the reading range can be also designated by using a digitizer. An image reproducing range may be also designated by the digitizer.

On the other hand, although the embodiment has been described with respect to the example in which an image is reproduced in a realtime manner while reading an image, it is also possible to construct in a manner such that after the read image data was once stored into the memory, a part of the image data is output, or after the whole image was reduced, it is output.

Although the embodiment has been described with respect to the case where the invention is applied to the color copying apparatus, the invention is not limited to such an embodiment but can be also applied to a simple image processing apparatus which does not always need an original. In addition, although an image has been reproduced by the ink jet recording method in the foregoing embodiment, the reproducing method is not limited to such an ink jet recording method. In brief, it is sufficient to reproduce an image as a visible image.

As described above, since the embodiment has been constructed as mentioned above, there is an advantage such that the color existing at a remote position on an original can be reproduced accurately according to the original or a desired color can be reproduced.

Further, according to the embodiment, there is an advantage such that the senses of feeling of a color in the cases where the color solely exists and where another color exists near that color can be previously compared.

What is claimed is:

1. An image processing apparatus comprising:
    a) means for supplying image data in first and second regions;
    b) changing means for changing a density of the image data supplied by said supplying means into a plurality of densities different from each other, wherein the plurality of densities correspond to the same image data; and
    c) reproducing means for reproducing the image data as a plurality of visible images which can be simultaneously seen, each of the visible images having a corresponding one of the plurality of densities;
    wherein a change of density of the image data in the first region by said changing means is the same as a change of density of the image data in the second region by said changing means.

2. An apparatus according to claim 1, wherein said supplying means supplies image data which is obtained by photoelectrically converting an object image.

3. An apparatus according to claim 1, wherein said changing means includes a table to change the density of the image data.

4. An apparatus according to claim 1, wherein said reproducing means comprises bubble jet recording means.

5. An apparatus according to claim 1, wherein the image data comprise color image data.

6. An apparatus according to claim 5, wherein said changing means comprises means for changing a hue.

7. An apparatus according to claim 1, wherein said supply means comprises means for supplying image data in a designated region.

8. An apparatus according to claim 7, further comprising:
    designating means for designating a region corresponding to the image data which is supplied by said supplying means.

9. An image processing apparatus comprising:
    a) means for supplying color image data;
    b) changing means for changing a color tone of the color image data supplied by said supplying means into a plurality of levels different from each other, wherein the plurality of levels correspond to the same color image data; and
    c) reproducing means for reproducing the color image data of which color tone is changed by said changing means as a plurality of visible images which can be simultaneously seen, each of the images having a corresponding one of the plurality of levels,
    wherein said reproducing means includes delaying means for delaying the color image data for forming a plurality of color component images.

10. An apparatus according to claim 9, wherein said supplying means supplies image data which is obtained by photoelectrically converting an object image.

11. An apparatus according to claim 9, wherein said changing means includes a table to change a color tone of the color image data.

12. An apparatus according to claim 9, wherein said reproducing means the bubble jet recording means.

13. An apparatus according to claim 9, further comprising:
    designating means for designating a region which is supplied by said supplying means.

14. An apparatus according to claim 13, wherein said designating means includes a digitizer.

15. An apparatus according to claim 9, wherein said supplying means supplies color image data in a plurality of designated regions.

16. An apparatus according to claim 14, wherein said digitizer designates a plurality of regions.

17. An image processing apparatus comprising:

a) designating means for designating on a color original;
b) image reading means for scanning a part of the color original including an image in the image reading region designated by said designating means;
c) density changing means for changing a density of a predetermined color of the image which was scanned by said reading means into a plurality of predetermined densities different from each other; and
d) reproducing means for reproducing the image having the changed density as a visible image at a predetermined position each time the density of the predetermined color is changed.

18. An apparatus according to claim 17, wherein said range designating means includes a digitizer.

19. An apparatus according to claim 17, wherein said image reading means includes:
A) photoelectric converting means for photoelectrically converting the image on said color original; and
B) means for changing a relative position between said photoelectric converting means and said color original.

20. An apparatus according to claim 17, wherein said density changing means includes a table.

21. An apparatus according to claim 17, wherein said reproducing means comprises a bubble jet recording means.

22. An apparatus according to claim 17, wherein said predetermined color includes Y, M, and C.

23. An image processing apparatus comprising:
a) means for supplying image data;
b) changing means for changing a density of the image data supplied by said supplying means into a plurality of densities different from each other, wherein said plurality of densities correspond to the same image data;
c) binarizing means for binarizing the image data of which density is changed by said changing means; and
d) reproducing means for reproducing the image data binarized by said binarizing means by depositing an ink on a recording medium, as a plurality of visible images which can be simultaneously seen, each of the visible images having a corresponding one of the plurality of densities.

24. An apparatus according to claim 23, wherein said supplying means supplies image data which is obtained by photoelectrically converting an object image.

25. An apparatus according to claim 23, wherein said reproducing means comprises bubble jet recording means.

26. An apparatus according to claim 23, wherein said image data comprises color image data.

27. An apparatus according to claim 26, wherein said changing means comprises means for changing a hue.

28. An apparatus according to claim 23, wherein said converting means comprises means for reducing the image data.

29. An apparatus according to claim 23, wherein said reproducing means simultaneously reproduces the image data whose density was changed by said changing means and which was variably magnified by said converting means as the plurality of visible images.

30. An image processing method comprising the steps of:
a) supplying color image data;
b) changing a predetermined amount of a predetermined color component constituting the color image data; and
c) repeating said supplying step and said changing step, wherein during said repeating step, the predetermined amount is changed successively per each repetition.

31. A method according to claim 30, wherein said supplying step includes a step for photoelectrically converting an object image.

32. A method according to claim 30, wherein the predetermined color component is selected from the group consisting of yellow, magenta, and cyan.

33. A method according to claim 30, further comprising reproducing step for reproducing the color image data changed during said changing step.

34. A method according to claim 33, wherein said reproducing step is a step for conducting reproduction by a bubble jet recording means.

35. A method according to claim 33, wherein said reproducing step is provided for reproducing a color image changed during said changing step.

36. An image processing apparatus comprising:
a) means for supplying image data;
b) changing means for changing a density of the image data supplied by said supplying means into a plurality of densities different from each other, wherein the plurality of densities correspond to the same image data;
c) binarizing means for binarizing the image data of which density is changed by said changing means; and
d) reproducing means for reproducing the binarized image data as a plurality of visible images which can be simultaneously seen, each of the images having a corresponding one of the plurality of densities.

37. An apparatus to claim 36, wherein said supplying means supplies image data which is obtained by photoelectrically converting an object image.

38. An apparatus according to claim 36, wherein said changing means comprises a table to change the density of the image data.

39. An apparatus according to claim 36, wherein said reproducing means comprises a bubble jet recording means.

40. An apparatus according to claim 36, wherein said image data comprises color image data.

41. An apparatus according to claim 40, wherein said changing means comprises means for changing a hue.

42. An apparatus according to claim 36, wherein said supply means comprises means for supplying image data in a designated region.

43. An apparatus according to claim 42, further comprising designating means for designating a region corresponding to the image data which is supplied by said supplying means.

* * * * *

UNITED STATES PATENT AND TRADEMARK OFFICE
CERTIFICATE OF CORRECTION

PATENT NO. : 5,204,736
DATED : April 20, 1993
INVENTOR(S) : SHUNICHI ABE

It is certified that error appears in the above-identified patent and that said Letters Patent is hereby corrected as shown below:

COLUMN 1
    Line 20, "apparatus" should read --apparatus,--.
    Line 28, "are" should read --is--.
    Line 32, "every" should read --in every--.
    Line 37, "or not" should be deleted.
    Line 43, "of" should be deleted.
    Line 49, "particularly" should read --particular,--.

COLUMN 2
    Line 52, "placing" should read --pressing--.
    Line 61, "a pulleys" should read --pulleys--; and "and 52," should read --51 and 52,--.

COLUMN 4
    Line 41, "are," should read --are--.
    Line 48, "direct," should read --direction--.
    Line 63, "drives" should read --drive--.

COLUMN 5
    Line 25, "going" should be deleted.

COLUMN 7
    Line 12, "on." should read --on--.
    Line 16, "of a" should read --a--.
    Line 47, "were" should read --are--.

COLUMN 10
    Line 22, "comprise" should read --comprises--.
    Line 56, "the" should read --comprises--.

UNITED STATES PATENT AND TRADEMARK OFFICE
CERTIFICATE OF CORRECTION

PATENT NO. : 5,204,736
DATED : April 20, 1993
INVENTOR(S) : SHUNICHI ABE

It is certified that error appears in the above-identified patent and that said Letters Patent is hereby corrected as shown below:

COLUMN 11
    Line 1, "designating on" should read --designating an image reading region on--.
    Line 20, "A)" should read --a)--.
    Line 23, "B)" should read --b)--.

COLUMN 12
    Line 20, "reproducing" should read --a reproducing--.

Signed and Sealed this

Nineteenth Day of April, 1994

BRUCE LEHMAN
Commissioner of Patents and Trademarks

Attest:

Attesting Officer